(12) United States Patent
Barna et al.

(10) Patent No.: US 6,452,666 B1
(45) Date of Patent: Sep. 17, 2002

(54) OPTICAL RANGE FINDER

(75) Inventors: Sandor L. Barna, Pasadena; Eric R. Fossum, La Crescenta, both of CA (US)

(73) Assignee: Photobit Corporation, Pasadena, CA (US)

( * ) Notice: Subject to any disclaimer, the term of this patent is extended or adjusted under 35 U.S.C. 154(b) by 0 days.

(21) Appl. No.: 09/429,882

(22) Filed: Oct. 29, 1999

Related U.S. Application Data
(60) Provisional application No. 60/106,377, filed on Oct. 29, 1998.

(51) Int. Cl.[7] ............................................. G01C 3/08
(52) U.S. Cl. ..................................... 356/5.01; 356/5.05
(58) Field of Search ............................. 356/5.01–5.08

(56) References Cited

U.S. PATENT DOCUMENTS

| | | | | |
|---|---|---|---|---|
| 3,900,261 A | * | 8/1975 | Wingate | |
| 5,056,922 A | | 10/1991 | Cielo et al. | 356/376 |
| 5,619,317 A | * | 4/1997 | Oishi et al. | |
| 5,745,442 A | | 4/1998 | Herscher | 368/118 |

* cited by examiner

Primary Examiner—Stephen C. Buczinski
(74) Attorney, Agent, or Firm—Fish & Richardson P.C.

(57) ABSTRACT

A method of determining a range of an object includes emitting light toward a target and sensing light reflected by the target. Signals corresponding to the sensed light are integrated during multiple integration periods. Each integration period is different from other integration periods. A range of the target can be calculated based on the integrated signals. A range finder for performing the foregoing technique also is disclosed.

28 Claims, 7 Drawing Sheets

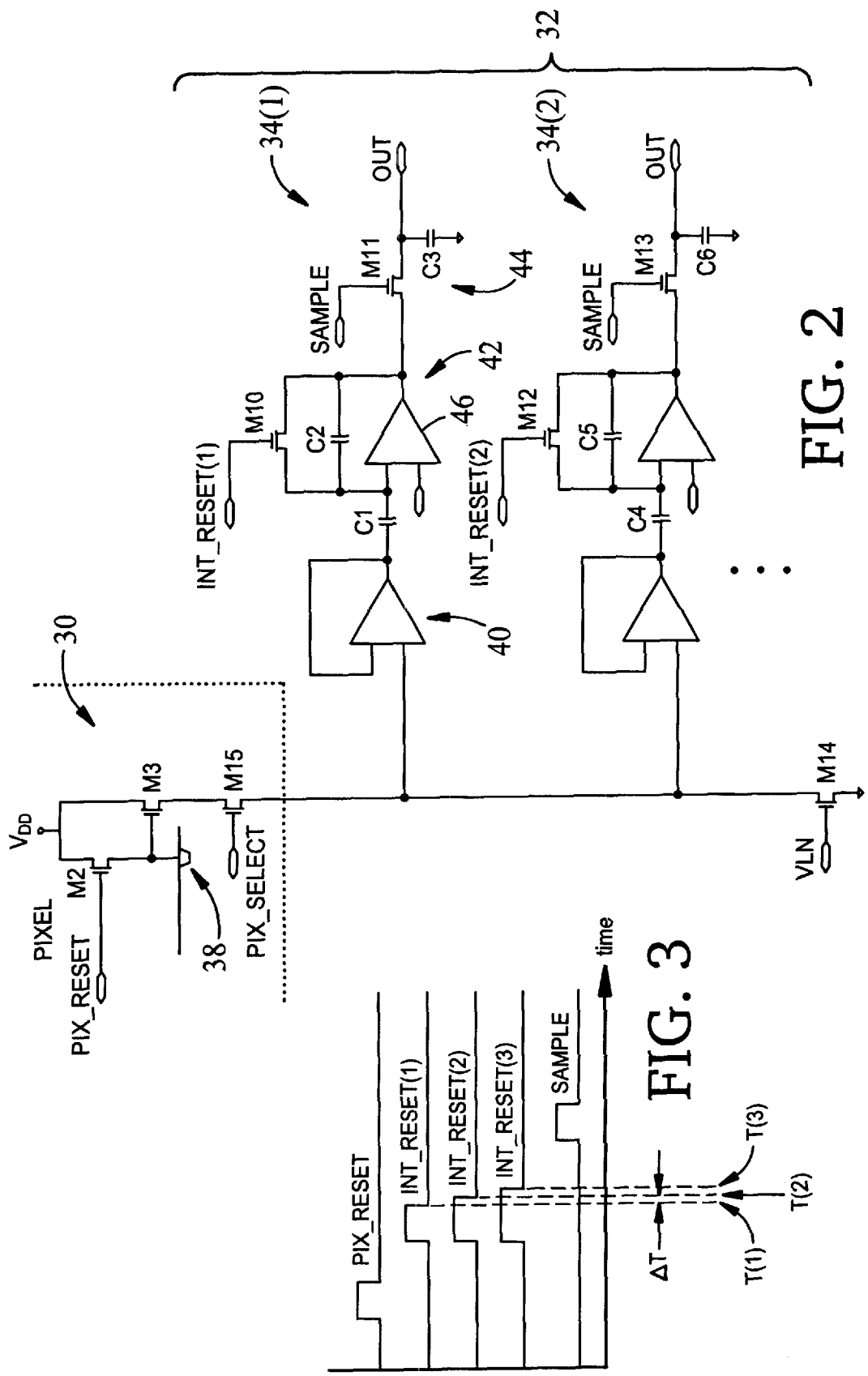

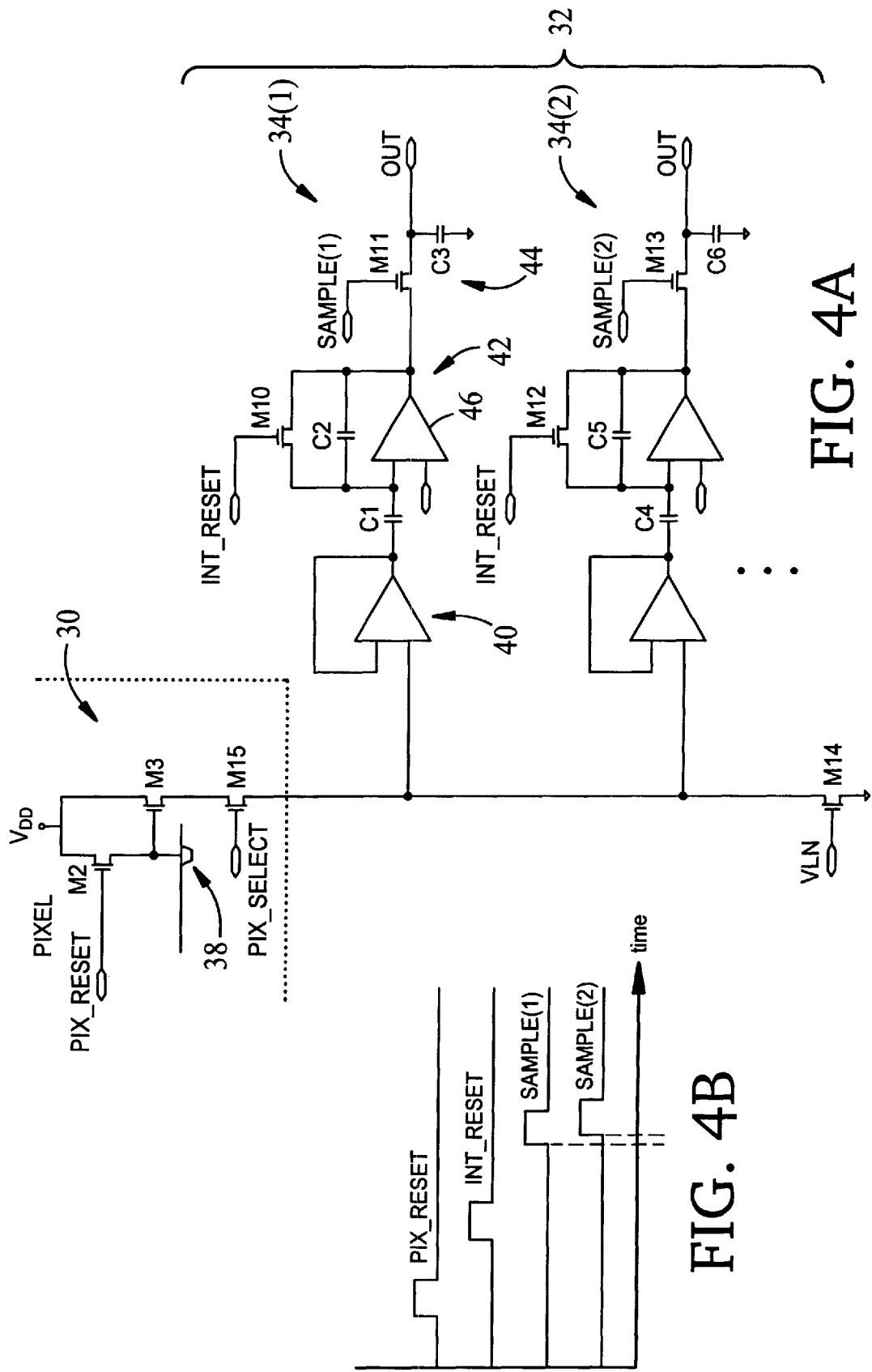

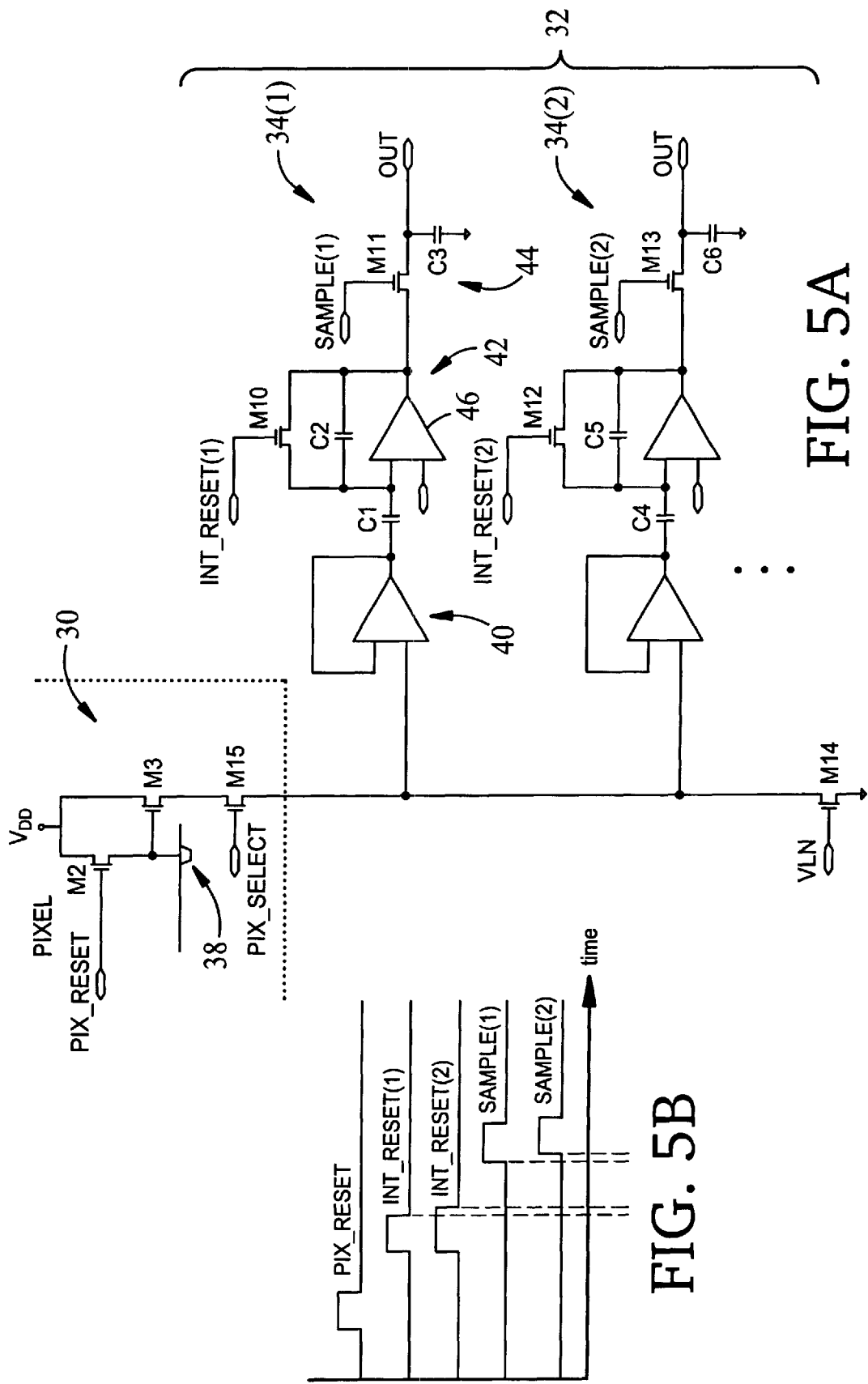

OPTICAL RANGE FINDER

CROSS-REFERENCE TO RELATED APPLICATION

This application claims the benefit of U.S. Provisional Application No. 60/106,377, filed on Oct. 29, 1998.

BACKGROUND

The present disclosure relates, in general, to optical range finders and, in particular, to time of flight optical range finders.

Range finding refers to a technique for determining the range, or distance, to a target and can be carried out using light pulses having a short duration. For example, a range finder can direct a burst of light, such as laser light, toward a target. The light strikes the target and propagates back toward the range finder. The time required for the light to travel from the range finder to the target, and then back to the range finder is measured by the range finder and is used to determine the target's range, in other words, the line-of-sight distance from the range finder to the target. The range from the source to the target is proportional to the speed of the light.

Range finding can be used in various industrial applications, such as machine vision. For example, a machine vision system with range finding capability can be used for machine safety. Such systems generally include a lighting system to illuminate the target and a camera for capturing light reflected from the target. The camera can include an array of photo-sensitive pixels.

For ranges on the order of several feet or less, the total travel time of the light is on the order of about several nanoseconds (nsec). It is often desirable to determine the range of the target with an accuracy of within several inches. Such accuracy requires that the travel time of the light be measured to within about one nanosecond or less. Unfortunately, photo-sensitive pixels, such as CMOS active pixel sensors (APS), may have inherent speed limitations on the order of about 5–10 nsec. Therefore, techniques are needed for measuring the duration between the beginning of the light pulse and the arrival of light reflected from the target where the duration may be less than the inherent speed limitation of the pixel.

SUMMARY

In general, according to one aspect, a method of determining a range of an object includes emitting light toward a target and sensing light reflected by the target. Signals corresponding to the sensed light are integrated during multiple integration periods. Each integration period is different from other integration periods. A range of the target can be calculated based on the integrated signals.

In various implementations, the integration periods may differ in duration, in the respective time frames over which they extend, or both. The integration periods may be shifted or offset from one another in time and may overlap one another.

Range finders for performing the foregoing techniques also are disclosed. According to one aspect, a range finder includes a light source arranged to emit light toward a target and a photo-sensitive pixel that receives light reflected by the target. The range finder includes a readout circuit which can be coupled to an output of the pixel. The readout circuit includes multiple integrator circuits in parallel. A controller can receive output signals from the readout circuit and is configured to control the readout circuit so that each integrator circuit in the readout circuit provides an integrated signal based on a pixel output signal using an integration period that is different from integration periods of other integrator circuits in the same readout circuit. The controller is further configured to calculate a range of the target based on the integrated signals obtained from the integrator circuits.

Some implementations include one or more of the following features. The controller can be configured to control the readout circuit so that the integrator circuits begin to integrate the pixel output signal at substantially the same time as one another and wherein outputs of the integrator circuits are sampled at different times from one another. Alternatively, the controller can be configured to control the readout circuit so that the integrator circuits begin to integrate the pixel output signal at different times from one another. Outputs of the integrator circuits also can be sampled at different times from one another. The integration times corresponding to the sampled outputs of the integrator circuits in the particular readout circuit can partially overlap one another.

The controller can be configured to calculate a centroid value based on the integrated signals obtained from the integrator circuits and to calculate the range of the target based on the centroid value.

Each integrator circuit can include a charge transimpedance amplifier circuit having an output coupled to a respective sample and hold circuit. The pixel output signal can be coupled to the charge transimpedance amplifier circuit via an operational amplifier follower. The charge transimpedance amplifier circuit can include an operational amplifier having an integration reset switch and a first capacitor coupled in parallel between an output of the operational amplifier and a first input of the operational amplifier. Additionally, the pixel output signal can be coupled to the charge transimpedance amplifier circuit via an operational amplifier follower. An output of the operational amplifier follower can be coupled to the first input of the operational amplifier through a second capacitor.

According to another aspect, a range finder includes a light source arrange to emit light toward a target and multiple photo-sensitive pixels that receive light reflected by the target. A readout circuit can be selectively coupled to a respective output of any one of the pixels. The range finder includes a controller coupled to an output of the readout circuit. The controller is configured to provide control signals to the pixels to establish a respective integration period for each pixel during which the pixel integrates light reflected by the target. The integration period for each pixel is different from the integration periods of other pixels. The controller is configured to provide control signals so that an output signal of each pixel is sent to the controller via the readout circuit following the integration period of the respective pixel. The controller is further configured to calculate a range of the target based on the pixel output signals received via the readout circuit.

Some implementations include one or more of the following features. The controller can provide control signals so that the integration times of the pixels start at substantially the same time as one another and end at different times from one another. Alternatively, the controller can provide control signals so that the integration times of the pixels start at different times from one another. The controller also can provide control signals so that the integration times of the pixels end at different times from one another. The integration times of the pixels can partially overlap one another.

Additionally, the controller can be configured to calculate a centroid value based on the pixel output signals received via the readout circuit and to calculate the range of the target based on the centroid value.

Each pixel can include, for example, a photogate-type or photodiode-type sensor. In some implementations, the range finder includes a lens arranged to direct the light reflected by the target substantially equally among the pixels.

Various implementations include one or more of the following advantages. The foregoing techniques, described in greater detail below, can be used to measure the duration between the beginning of the light pulse and the arrival of light reflected from the target even where the duration may be less than the inherent speed limitations of the pixel(s). Thus, range finders with greater accuracy can be provided. In particular, the range of a target can be determined with high accuracy even if the range is relatively small, in other words, if the target is relatively close to the range finder such that the time of flight of the pulse is on the order of about a nanosecond or less.

Other features and advantages will be readily apparent from the following description, accompanying drawings and the claims.

BRIEF DESCRIPTION OF THE DRAWINGS

FIG. 2 illustrates a pixel coupled to a readout circuit with multiple integration stages according to the invention.

FIG. 3 is a timing diagram of control signals corresponding to the circuitry of FIG. 2.

FIG. 4A illustrates a second embodiment of a pixel coupled to a readout circuit with multiple integration stages according to the invention.

FIG. 4B is a timing diagram of control signals corresponding to FIG. 4A.

FIG. 5A illustrates a third embodiment of a pixel coupled to a readout circuit with multiple integration stages according to the invention.

FIG. 5B is a timing diagram of control signals corresponding to FIG. 5A.

DETAILED DESCRIPTION

Figure 1:
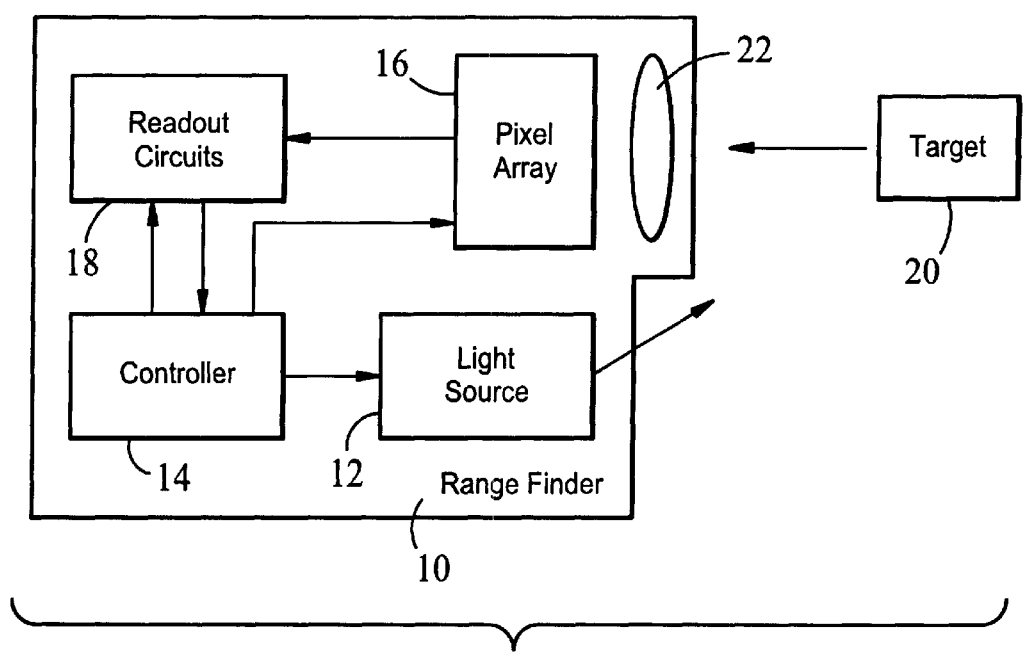
FIG. 1 illustrates a range finding apparatus according to the invention.

As shown in FIG. 1, a range finder 10 includes a light source, such as a laser 12, a controller 14, an array 16 of photo-sensitive pixels and pixel readout circuits 18. In various implementations, the light source 12 can emit visible or non-visible light. The controller 14 can be implemented, for example, using an on-chip processor, a general purpose computer or a specific purpose computer. The controller 14 provides control signals to the light source 12 to project pulses of light to a target 20 and also provided control signals to the pixels in the array 16 and the readout circuits 18. The controller 14 also processes electrical signals received from the readout circuits 18. Additionally, the controller 14 includes an internal clock and memory to keep track of when a light pulse is transmitted from the ranger 10 and to keep track of when signals representing the light pulse reflected from the target 20 are received by pixels in the array 16. In an exemplary implementation, the array 16 is a one-dimensional array, although higher dimensional pixel arrays also can be used. A lens 22 may also be provided to gather light reflected from the target 20 and to direct the reflected light to the pixel array 16.

As described in greater detail below, light reflected from the target 20 is integrated over multiple time periods which are at least partially offset from one another. The integrated signals from the time periods can then be processed to obtain a more accurate range for the target. In some implementations, the time intervals partially overlap one another.

One implementation is shown in FIG. 2. Output signals from a pixel in the array 16, for example, a photodiode-type pixel 30, can be read out to a respective readout circuit 32 that includes multiple parallel integrator circuits 34(1), 34(2). The readout circuit 32 includes a load transistor M14 with a signal (VLN) applied to its gate. The load transistor M14 acts as current sink for the pixel 30. Although only two integrator circuits 34(1), 34(2) are shown in FIG. 2, a greater number of such circuits can be coupled to the output of the pixel 30. In general, a greater number of integrator circuits 32 can provide greater accuracy in measurements of the range of a target. A respective readout circuit having multiple parallel integration stages can be associated with each pixel in the array.

The photodiode-type pixel 30 has a photo-sensitive element which, in the implementation of FIG. 2, includes a diffusion output 38 buffered by a source-follower transistor M3 and a pixel selection switch which can be implemented by a transistor M15. A signal (PIX_SELECT) is applied to the gate of the pixel selection transistor M15 enable a particular pixel or row of pixels to be read out to the readout circuit 32. The pixel 50 also includes a reset switch which can be implemented as a transistor M2 controlled by a signal (PIX_RESET) applied to its gate.

Each integrator circuit, such as the integrator circuit 34(1), can include an operational amplifier (op amp) follower 40, a charge transimpedance amplifier circuit 42 and a sample and hold circuit 44. The output of the pixel is coupled to a first input of the op amp follower 40. The output of the op amp follower 40 is coupled to a second input of the op amp follower. In general, a signal appearing at the first input of the op amp follower 40 is reproduced at its output. The op amp follower 40 provides isolation between the pixel and the rest of the integrator circuit 34(1).

The charge transimpedance amplifier circuit 42 includes an op amp 46 with an integration reset switch M10 and a capacitor C2 coupled in parallel between the output of the op amp 46 and a first one of its inputs. The output of the op amp follower 40 is coupled to the first input of the op amp 46 through a capacitor C1. A fixed voltage signal (Vcharge) is applied to the second input of the op amp 46. In general, the charge transimpedance amplifier circuit samples an input charge and feeds back a substantially proportional voltage in series with the input.

A signal (INT_RESET(1)) controls the state of the switch M10. A similar signal (INT_RESET(2)) controls the state of a corresponding switch M12 in the charge transimpedance amplifier circuit of the next integrator circuit 34 (2), and so on. When the switch M10 is closed, in other words, when the signal INT_RESET goes high, the op amp is reset. When the switch M10 is opened, in other words, when the signal INT_RESET goes low, an integration period begins so that any change to the signal stored by the capacitor C1 appears at the output of the op amp 46. The gain provided between the input and output of the charge transimpedance amplifier circuit 42 is equal to the ratio $-C_1/C_2$.

The signal appearing at the output of the charge transimpedance amplifier circuit 42 can then be sampled and stored by the sample and hold circuit 44. The sample and hold circuit 44 can include a switch M11, whose state is controlled by a signal (SAMPLE), and a capacitor C3. When the switch M11 is closed, in other words, when the signal SAMPLE goes high, the capacitor charges to the voltage appearing at the output of the op amp 42.

FIG. 3 shows an exemplary timing diagram for the readout circuit 32. Initially, the pixel 30 is reset when the signal PIX_RESET goes high. Charge collected by the floating diffusion 38 can be read out to the various integrator circuits 34(1), 34(2) by turning on the pixel selection switch M15. Each charge transimpedance amplifier circuit 42 is reset and begins to integrate the signal from the pixel when its respective integration reset switch (e.g., M10, M12) is opened. For example, the charge transimpedance amplifier circuit 42 in the integrator circuit 34(1) starts to integrate the pixel signal at a time T(1), whereas the charge transimpedance amplifier circuit in the integrator circuit 34(2) starts to integrate the pixel signal at a subsequent time T(2). The charge transimpedance amplifier circuit in a third integrator circuit (not shown) may start to integrate the pixel signal at yet a later time T(3). In the timing diagram of FIG. 3, the start of the integration times of the various charge transimpedance amplifier circuits are offset from one another by a period $\Delta T$. In one implementation, the offset $\Delta T$ is approximately one nsec. In general, however, the size of the offset can be smaller or larger and will depend on the particular application.

Figure 10:
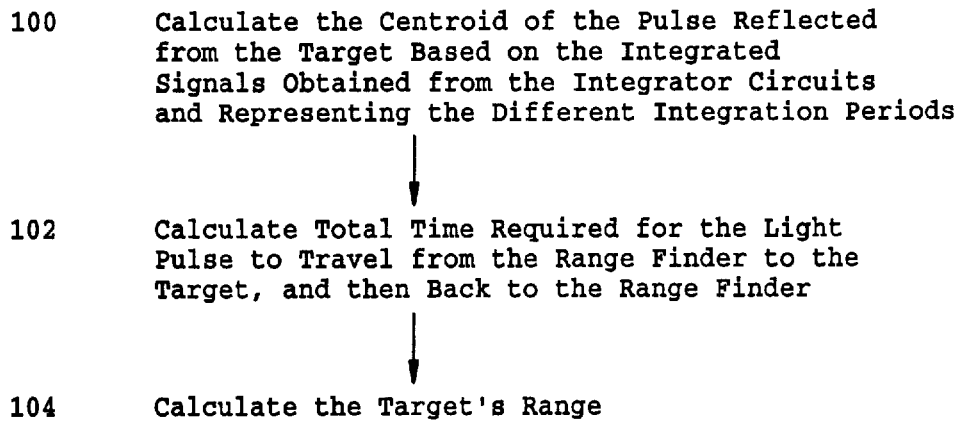
FIG. 10 is a flow chart showing some of the steps in a method according to the invention.

At a subsequent time, the outputs of the charge transimpedance amplifier circuits 42 are sampled and stored by the respective sample and hold circuits 44 when the signal SAMPLE goes high. In such an implementation, the same signal (SAMPLE) can be simultaneously applied to the switches M11, M13 so that the signals stored by the capacitors in the sample and hold circuits 44 are sampled at substantially the same time. The integrated signals stored by the sample and hold capacitors (C3, C6) can then be provided to the controller 14 which calculates the centroid of the pulse reflected from the target 20 based on the integrated signals obtained from the integrator circuits (step 100, FIG. 10). The centroid of the pulse sometimes is referred to as the center of gravity of the pulse.

Based on the calculated centroid value, the controller 14 can calculate the total time required for the light pulse to travel from the range finder 10 to the target 20, and then back to the range finder (step 102). The time resolution is approximately $\Delta T/N$, where N is the number of integrators in the readout circuit 32. Using the calculated total time and the speed of light, the controller 14 can calculate the target's range (step 104).

According to another implementation, instead of staggering the start of the integration times for the integrator circuits, each of the charge transimpedance amplifier circuits could start to integrate the pixel signal at substantially the same time. The integrated signals could then be sampled at different times by providing a different signal (SAMPLE (N)) to each of the switches M11, M13 in the sample and hold circuits 44 (FIGS. 4A and 4B). Alternatively, sequential integration periods of a predetermined duration can be used so that the start of the integration period of each integrator circuit as well as the sample time are offset from the start and sample times of for the other integrator circuits (FIGS. 5A and 5B).

Whichever technique is used to offset the integration periods of the integrator circuits 34(1), 34(2), the controller 14 uses the sampled values obtained from the integrator circuits to calculate the centroid value of the pulse reflected from the target 20. The range of the target 20 then can be calculated.

Techniques for calculating a centroid value are well known. For example, if the integration periods of the integrator circuits are overlapping and each integration period has a duration L and is offset from the previous period by a time t, then the centroid (c) can be calculated as follows:

$$c = t \cdot \frac{\sum_{n=l}^{N} \sum_{i=l}^{L} n \cdot (I_{n+i})}{\sum_{n=l}^{N} \sum_{i=l}^{L} I_{n+i}}$$

Figure 6:
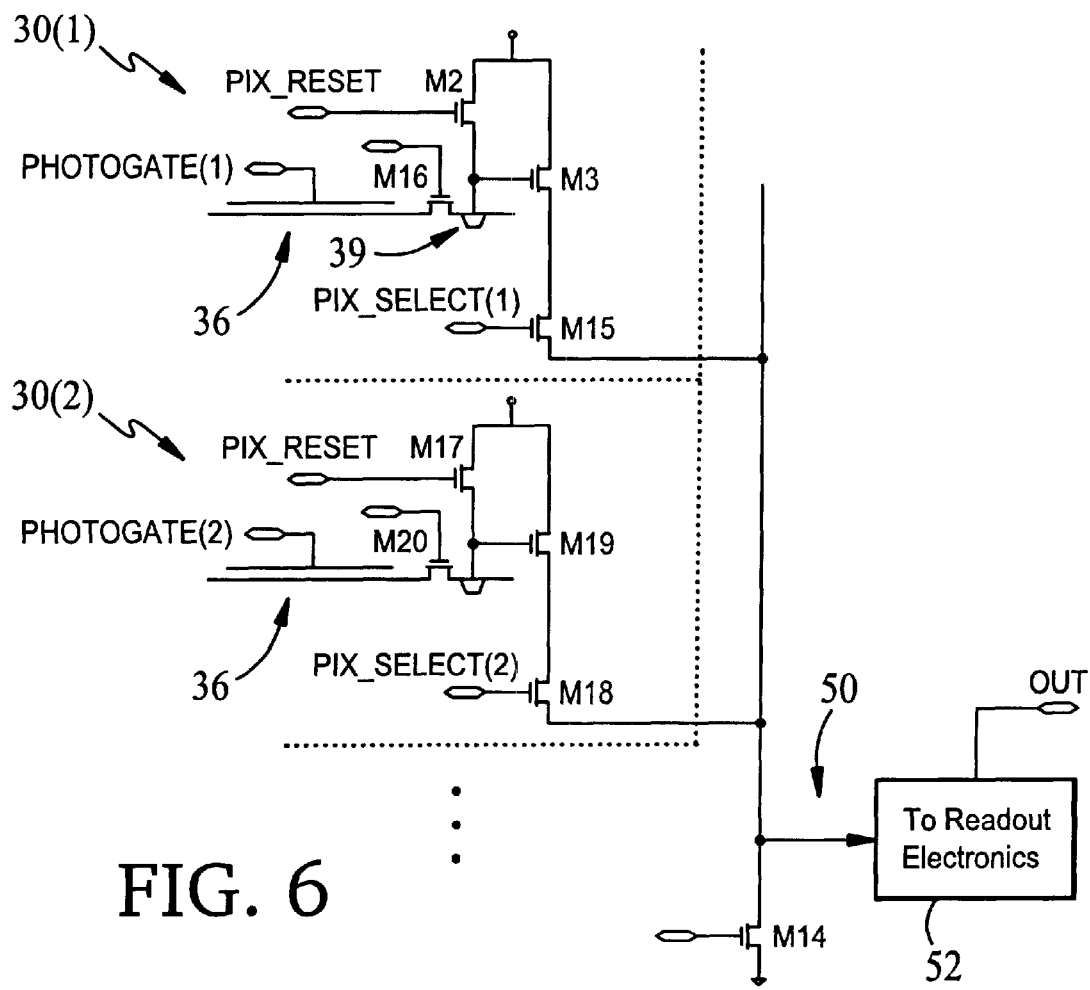
FIG. 6 illustrates multiple pixels coupled to a readout circuit with a single integration stage according to the invention.

A different embodiment is shown in FIG. 6. Instead of coupling a single pixel to an output signal chain having multiple parallel integration stages, multiple integrations are performed using N separate photogate-type pixels 30(1), 30(2). Each pixel 30(1), 30(2) has a photo-sensitive element which, in the implementation of FIG. 6, includes a photogate 36 with a floating diffusion output 39 separated by a transfer gate M16. A signal (TX) is applied to the transfer gate M16 to transfer charge from the photogate 36 to the floating diffusion output 39. The photo sensitive element is buffered by a source-follower transistor M3 and a pixel selection switch which can be implemented by a transistor M15. A signal (PIX_SELECT) is applied to the gate of the pixel selection transistor M15 enable a particular pixel or row of pixels to be read out to the readout circuit 32. The pixel 50 also includes a reset switch which can be implemented as a transistor M2 controlled by a signal (PIX_RESET) applied to its gate.

The photogate 36 in the pixel 30(1) is controlled by a signal (PHOTOGATE(1)), whereas the photogate 36 in the pixel 30(2) is controlled by a signal (PHOTOGATE(2)). Although only two pixels are shown in FIG. 6, a greater number of pixels can be used. In general, the greater the number of pixels, the greater the time resolution of the measured light pulse reflected from the target 20.

The outputs of the pixels 30(1), 30(2) can be coupled to a single readout circuit 50 which includes a load transistor M14 that acts as current sink. The readout circuit 50 also includes readout electronics 52 for processing the signals from the pixels. The readout electronics 52 can include, for example, standard CMOS APS digital or analog readout circuitry. Such readout circuitry can include source-followers or amplifiers to buffer and/or amplify the signals prior to processing them by the controller 14.

Output signals from the pixels 30(1), 30(2) are coupled to the readout circuit 50 by closing a pixel selection switch (e.g., M15 M18). The pixel selection switch M15 the pixel 30(1) is controlled by a signal (PIX_SELECT(1)), whereas the pixel selection switch M18 in the pixel 30(2) is controlled by a signal (PIX_SELECT(2)).

The amount of reflected light received by the pixel 30(1) should be substantially the same as the pixel 30(2). For that purpose, a lens 22 (see FIG. 1) can be placed between the target 20 and the pixel array 16 to direct the light reflected by the target substantially equally among the pixels whose output is to be coupled to the readout circuit 50. If the light reflected from the target 20 is to be split among N pixels, then the amplitude of the light pulse emitted by the light source 12 should be increased by a factor of N.

In general, in the embodiment of FIG. 6, the integration time for each pixel is different from the integration time of the other pixels whose output is to be coupled to the readout circuit 50. Each pixel integrates the optical signal it receives while the signal applied to its photogate 36 is high. The floating diffusion 39 stores the integrated signal which subsequently can be read out by closing the corresponding pixel selection switch (e.g., M15 M18).

Figure 7:
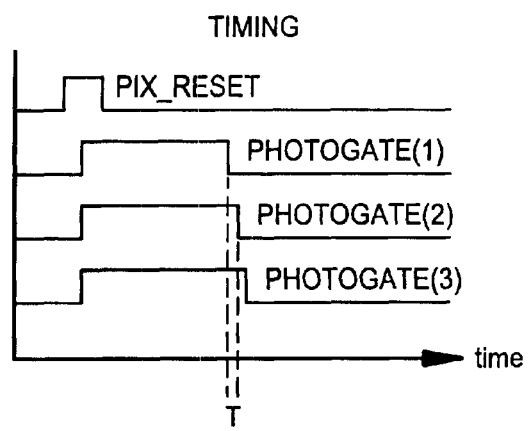
FIG. 7 is an exemplary timing diagram of control signals for the pixels of FIG. 6.

FIG. 7 is an exemplary timing diagram for the embodiment of FIG. 6. The pixels 30(1), 30(2) initially are reset when the PIX_RESET signal goes high. As shown in FIG. 7, the integration periods of the pixels 30(1), 30(2) begin at the same time, in other words, when the PHOTOGATE(1) and PHOTOGATE(2) signals go high. A third signal (PHOTOGATE(3)) corresponds to a third pixel (not shown) whose output also can be coupled to the readout circuit 50. The integration periods for the pixels end at different times and are offset from one another by a period ΔT. The signals stored by the respective floating diffusion regions 39 can be read out sequentially one at a time by the readout circuit 50.

As the integrated pixel signals are read out, they are received and processed by the controller 14 which calculates the centroid of the pulse reflected from the target 20 based on the signals integrated by the pixels 30(1), 30(2). As previously described, the controller 14 then calculates the time for the light pulse to travel from the range finder 10 to the target 20, and then back to the range finder. Finally, the controller 14 calculates the target's range based on the calculated time and the speed of light.

Figure 8:
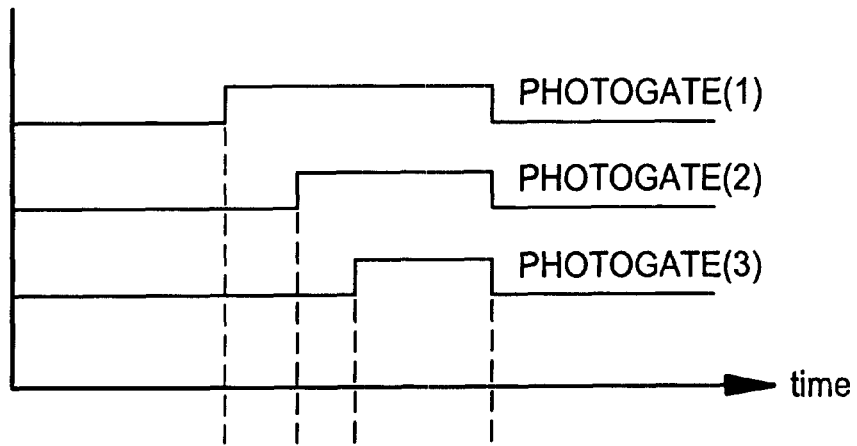
FIGS. 8 and 9 are alternate timing diagrams of control signals for the pixels of FIG. 6.
Figure 9:
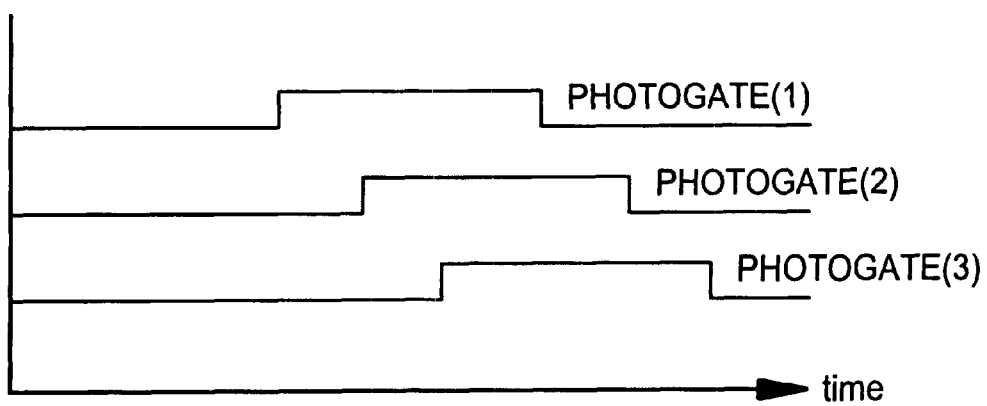

In other implementations, the signals applied to the photogates 36 of the pixels 30(1), 30(2) can be controlled so that the pixel integration periods begin at different times, but end at the same time (FIG. 8). Alternatively, the pixel integration periods can begin at different times and also end at different times, for example, as shown in FIG. 9. In each case, the controller 14 calculates the centroid of the pulse reflected from the target 20 based on the signals integrated by the pixels and then calculates the target's range based on the calculated centroid.

Figure 11:
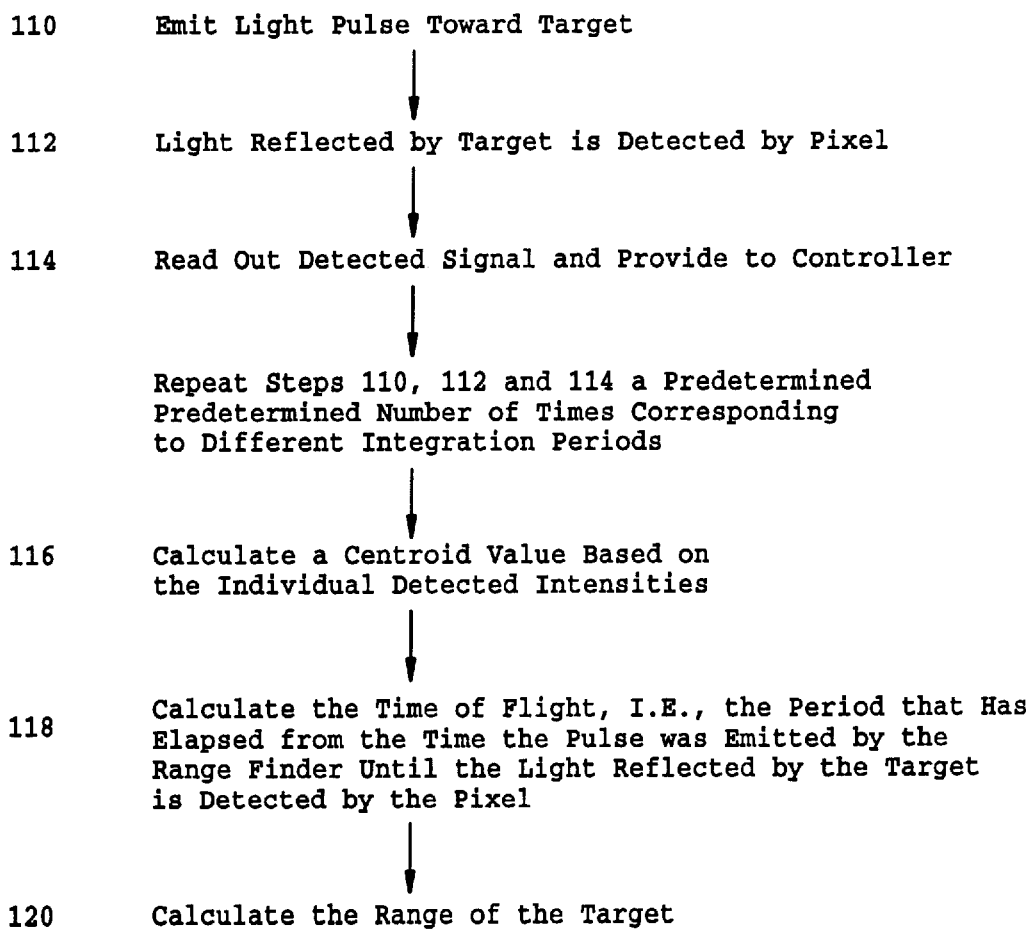
FIG. 11 is a flow chart showing steps according to another method of the invention.

In a further implementation, different integration periods can be provided using a single pixel coupled to a readout circuit with a single integration stage. In that case, a light pulse is emitted toward the target 20 (FIG. 11, step 110). Light reflected from the target is detected by the pixel (step 112). The detected signal subsequently is read out from the pixel and provided to the controller 14 (step 114). Steps 110, 112 and 114 are repeated during sequential time intervals. The controller 14 then calculates a centroid value based on the individual detected intensity values (step 116). The period that elapsed from the time the pulse was emitted by the range finder until the light reflected by the target 20 was detected by the pixel can be calculated using the calculated centroid value (step 118). The controller 14 then calculates the range of the target 20 (step 120) based on the calculated centroid value.

Other implementations are within the scope of the following claims.

What is claimed is:

1. A range finder comprising:
    a light source arranged to emit light toward a target;
    a photo-sensitive pixel for receiving light reflected by the target;
    a readout circuit which can be coupled to an output of the pixel, wherein the readout circuit includes a plurality of integrator circuits in parallel; and
    a controller which can receive output signals from the readout circuit, wherein the controller is configured to control the readout circuit so that each integrator circuit in the readout circuit provides to the controller an integrated signal based on a pixel output signal using a total integration period that is different from total integration periods of the other integrator circuits, and wherein the controller is further configured to calculate a range of the target based on the integrated signals obtained from the integrator circuits.

2. The range finder of claim 1 wherein the controller is configured to control the readout circuit so that the integrator circuits begin to integrate the pixel output signal at substantially the same time as one another and wherein outputs of the integrator circuits are sampled at different times from one another.

3. The range finder of claim 1 wherein the controller is configured to control the readout circuit so that the integrator circuits begin to integrate the pixel output signal at different times from one another.

4. The range finder of claim 3 wherein outputs of the integrator circuits are sampled at different times from one another.

5. The range finder of claim 4 wherein the integration times corresponding to the sampled outputs of the integrator circuits partially overlap one another.

6. The range finder of claim 1 wherein each integrator circuit includes a charge transimpedance amplifier circuit, wherein an output of the charge transimpedance amplifier circuit is coupled to a respective sample and hold circuit.

7. The range finder of claim 6 wherein the pixel output signal is coupled to the charge transimpedance amplifier circuit via an operational amplifier follower.

8. The range finder of claim 6 wherein the charge transimpedance amplifier circuit includes an operational amplifier having an integration reset switch and a first capacitor coupled in parallel between an output of the operational amplifier and a first input of the operational amplifier.

9. The range finder of claim 8 wherein the pixel output signal is coupled to the charge transimpedance amplifier circuit via an operational amplifier follower, and wherein an output of the operational amplifier follower is coupled to the first input of the operational amplifier through a second capacitor.

10. The range finder of claim 1 wherein the controller is further configured to calculate a centroid value based on the integrated signals obtained from the integrator circuits and to calculate the range of the target based on the centroid value.

11. The range finder of claim 1 wherein the photosensitive pixel includes a photodiode-type sensor.

12. A range finder comprising:
    a light source arranged to emit light toward a target;
    a plurality of photo-sensitive pixels for receiving light reflected by the target;
    a readout circuit which can be selectively coupled to a respective output of any one of the pixels; and
    a controller coupled to an output of the readout circuit, wherein the controller is configured to provide control signals to the pixels to establish a respective integration period for each pixel during which the pixel integrates light reflected by the target, wherein the integration period for each pixel is different from the integration periods of other pixels, wherein the controller is configured to provide control signals so that an output signal of each pixel is sent to the controller via the readout circuit following the integration period of the respective pixel, and wherein the controller is further configured to calculate a range of the target based on the pixel output signals received via the readout circuit.

13. The range finder of claim 12 wherein each pixel includes a photogate-type sensor.

14. The range finder of claim 12 wherein the controller provides control signals so that the integration times of the pixels start at substantially the same time as one another and end at different times from one another.

15. The range finder of claim 12 wherein the controller provides control signals so that the integration times of the pixels start at different times from one another.

16. The range finder of claim 12 wherein the controller provides control signals so that the integration times of the pixels end at different times from one another.

17. The range finder of claim 16 wherein the integration times of the pixels partially overlap one another.

18. The range finder of claim 12 wherein the controller is further configured to calculate a centroid value based on the pixel output signals received via the readout circuit and to calculate the range of the target based on the centroid value.

19. The range finder of claim 12 including a lens arranged to direct the light reflected by the target substantially equally among the pixels.

20. A method of determining a range of an object, the method comprising:

emitting light toward a target;

sensing light reflected by the target;

integrating signals corresponding to the sensed light during a plurality of integration periods, wherein each integration period is different from other integration periods; and calculating a range of the target based on the integrated signals.

21. The method of claim 20 including:

calculating a centroid value based on the integrated signals; and calculating the range of the target based on the centroid value.

22. The method of claim 20 wherein said sensing reflected light includes sensing the reflected light with a plurality of photo-sensitive pixels, and wherein each of the plurality of pixels integrates light reflected by the target for a total interval of time different from total intervals of time during which the other pixels integrate the reflected light.

23. The method of claim 22 including reading out the integrated signals.

24. The method of claim 22 including directing the light reflected from the target substantially equally among the pixels.

25. The method of claim 20 including sensing the reflected light with a photo-sensitive pixel and reading out a signal from the pixel, wherein integrating the signal includes integrating the signal obtained from the pixel using a plurality of integrator circuits in parallel.

26. The method of claim 20 wherein the integration periods begin at different times from one another.

27. The method of claim 20 wherein the integration periods end at different times from one another.

28. The method of claim 20 wherein the integration periods begin at different times from one another and end at different times from one another.

* * * * *